United States Patent [19]

Hall

[11] 4,281,846
[45] Aug. 4, 1981

[54] ANTI-JACKKNIFE MECHANISM

[76] Inventor: Kenneth A. Hall, 7710 Goodall Rd., Durand, Mich. 48429

[21] Appl. No.: 87,871

[22] Filed: Oct. 24, 1979

[51] Int. Cl.³ .............................................. B62D 53/08
[52] U.S. Cl. ................................. 280/432; 280/446 B; 280/474
[58] Field of Search ..................... 280/432, 474, 446 B

[56] References Cited

U.S. PATENT DOCUMENTS

| 2,259,923 | 10/1941 | Byrne | 280/432 |
|---|---|---|---|
| 2,762,634 | 9/1956 | Moseley | 280/432 |
| 3,311,390 | 3/1967 | Rendessy | 280/504 |
| 3,393,923 | 7/1968 | Rendessy | 280/446 B |
| 4,068,860 | 1/1978 | Meyers | 280/432 |

Primary Examiner—John P. Silverstrim
Attorney, Agent, or Firm—Fisher, Gerhardt, Crampton & Groh

[57] ABSTRACT

An anti-jackknife mechanism for a tractor-trailer arrangement wherein a stop member on the tractor and an assembly on the trailer can be positioned relative to each other so that an angular change between the tractor and trailer from its normally longitudinally aligned position is resiliently resisted and such resilient resistance is under the control of fluid motors.

4 Claims, 3 Drawing Figures

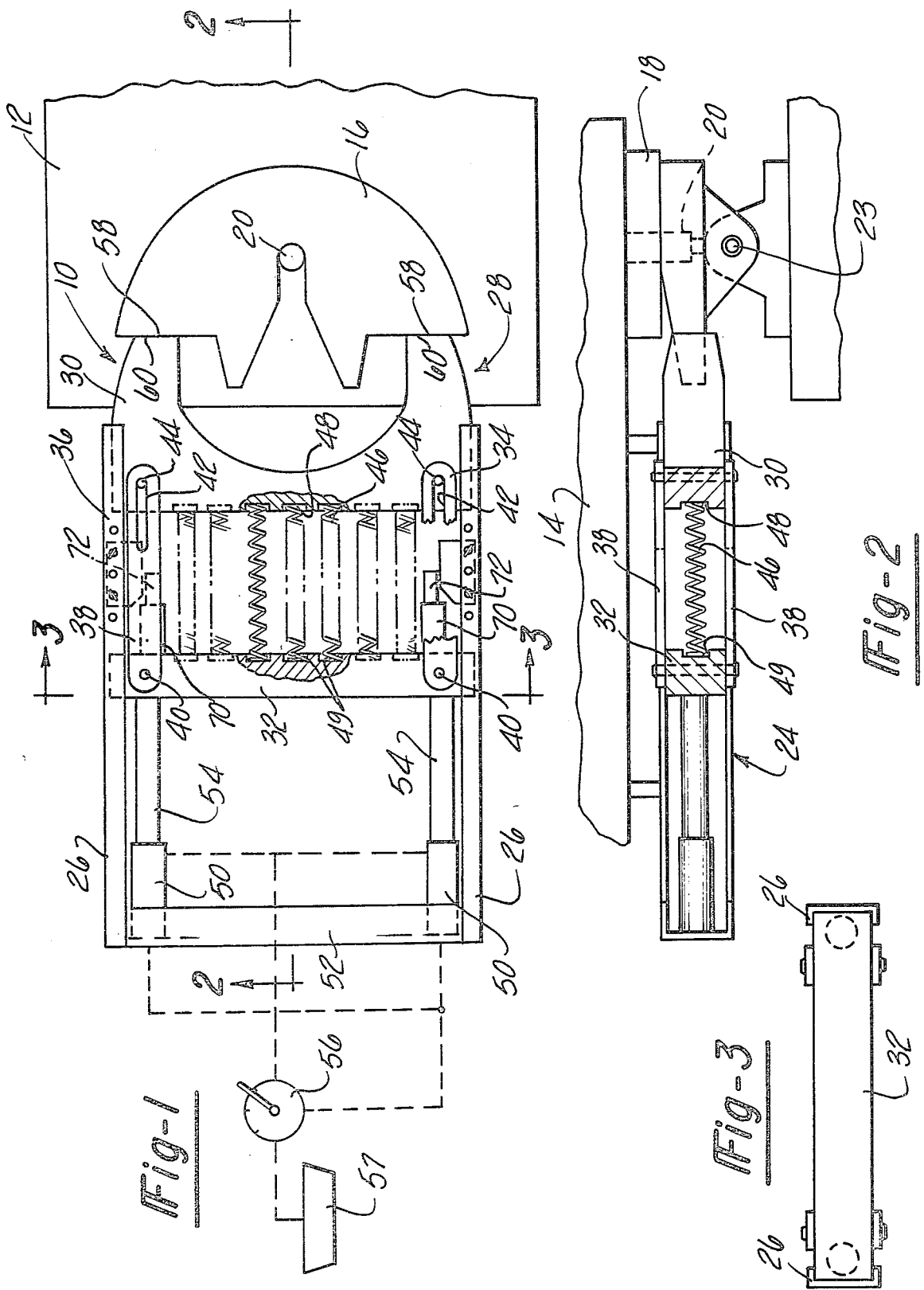

ANTI-JACKKNIFE MECHANISM

This invention relates to tractor-trailer vehicles and more particularly to means for preventing jackknifing of the vehicle.

In tractor-trailer vehicles, operations on slippery road surfaces can cause uncontrolled articulation between the tractor and the trailer causing the trailer to swing about the connecting axis. Since the trailer usually is heavier than the tractor unit, the tractor unit also is forced out of control resulting in the jackknife condition which often results in the loss of life and property damage.

A variety of anti-jackknife arrangements have proposed, many of which lock the tractor and trailer relative to each other to limit the amount of angular movement. Some such devices permit a limited amount of angular movement before positively locking the tractor and trailer relative to each other.

It is an object of the present invention to provide an anti-jackknifing device which can be put in operation to resiliently resist jackknifing.

It is another object of the invention to provide an anti-jackknifing mechanism which can be selectively operated to permit normal articulation or under suspected jackknifing conditions to resiliently resist angular change between the tractor and the trailer.

The objects of the invention are accomplished by an anti-jackknife mechanism for a tractor-trailer combination wherein the tractor and trailer are coupled together for articulation about a vertical axis and wherein a stop member is fixed on the tractor for movement relative to an assembly mounted on the trailer. The assembly on the trailer is movable to selected positions between a first position wherein the tractor and trailer are free to pivot relative to each other about a vertical connecting axis and the second position wherein the movable assembly engages the stop member to resiliently resist a change in angular position between the tractor and trailer. The movable assembly on a trailer includes a base member and a buffer member spaced from each other but movable as a unit relative to the stop members. The base member and buffer member are held at a maximum spaced relationship and movement toward each other is resiliently resisted to resist articulation between the tractor and trailer.

These and other objects of the invention will become apparent from the following description and from the drawings in which:

FIG. 1 is a diagramatic top view of an anti-jackknife device bodying the invention;

FIG. 2 is a fragmentary side view of the arrangement shown in FIG. 1 with parts in section; and FIG. 3 is a cross sectional view on line 3—3 in FIG. 1.

The anti-jackknife mechanism embodying the invention is generally at 10 and is illustrated in association with a tractor indicated diagramatically at 12, and a trailer also illustrated diagramatically at 14. The tractor 12 has a fifth wheel coupler 16 and the trailer or semi-trailer 14 is provided with a wear plate 18 and a vertically extending coupling or king pin 20. The coupling arrangement including the fifth wheel 16, the wear plate 18 and king pin 20 are typical of types commonly used in the trucking industry to proivde the connection by which the semi-trailer is towed by the tractor and affords articulation between the tractor 12 and trailer 14.

The king pin 20 affords a substantial vertical axis about which the tractor and trailer normally are articulated relative to each other and also the axis about which jackknifing occurs.

The fifth wheel coupler 16 is mounted on the tractor for a limited angular movement about a horizontal trunnion shaft 23 but is movable in a generally horizontal plane as a unit with the tractor during angular articulation between the tractor and the trailer about king pin 20.

The trailer associated portion of the coupling mechanism includes a frame 24 formed by a pair of parallel channel members 26 which extend generally longitudinally and at the underside of the trailer 14. The channel members 26 form guides for slidably supporting a movable assembly 28 which includes a buffer member 30 and a base member 32 both which can be made of cast metal. The base member 32 and buffer member 30 are interconnected by a pair of link assemblies 34 and 36 each of which is made up of a pair of identical links 38. The pair of links 38 making up the link assembly 34 are disposed above and below the base member 32 and are connected thereto by means of a pin 40. The forward ends of the links 38 are provided with slots 42 which slidably receive pins 44 passing through the buffer member 30. The link assembly 36 at the opposite side of the movable assembly 28 are identically connected to the base member 32 and buffer member 30 by means of pins 40 and 44, respectively. The pins 44 are maintained at one end of the slots 42 as best seen in FIG. 1 by means of a plurality of heavy coil springs 46 which are illustrated diagramatically as being seated in spring seats 48 formed in the buffer member 30 and spring seats 49 formed in base member 32. The springs 46 resiliently urge the members 30 and 32 apart so that the pins 44 are seated at the extreme ends of the slots 42. The slots 42, however, permit the buffer member to move toward the base member 32 under certain conditions of operation.

The movable assembly 28 is movable by means of hydraulic actuators 50 mounted on a cross member 52 and having extensible rods 54 with their ends connected to the base member 32. The hydraulic actuators 50 are of the double acting type and are connected to a control valve 56 preferably operated from a position in the drivers cab on the trailer to deliver hydraulic fluid from a source such as a pump 57 to the actuators 50.

The two way hydraulic actuators 50 may be moved from their retracted position to the extended position shown in FIG. 1 upon manipulation of the control valve 56 to actuate the hydraulic actuators 50. In the position shown in FIG. 1, the buffer member 30 has a pair of abuttment surfaces 58 which are laterally spaced apart and are engagable with a pair of complementary stop surfaces 60 formed on the fifth wheel coupler 16. The entire movable assembly 28 including the buffer member 32 and base member 32 can be moved to a retracted position spaced from the fifth wheel coupler 16 by manipulating the three-way valve 56 to retract the hydraulic actuators 50. In the retracted position the movable assembly 28 permits articulation between the tractor and trailer without interference of the anti-jackknife mechanism.

When road surface conditions become such that a driver suspects jackknife conditions, the three-way valve 56 can be manipulated to move the assembly 28 from its retracted or first position toward a second position in which the buffer member 30 and more particularly the abuttment surface 58 are in engagement with the stop surfaces 60 as best seen in FIG. 1. Under such circumstances any tendency of the tractor 12 to change its angular disposition relative to the trailer 14 will be resisted by the springs 46. For example, if the tractor tends to turn to the left or in a counter clockwise direction relative to the king pin 20 as view in FIG. 2, the buffer member 30 will be pivoted about the pin 40 associated with the link assembly 34 and the pin 40 associated with the link assembly 36 will slide in the slots 42. Such motion will tend to compress the springs 46 with the degree of compression greatest on the side of the trailer toward which the tractor 12 turns and resists a change in angular disposition between the tractor 12 and trailer 14. In this manner, jackknifing of the tractor and trailer are resiliently resisted.

If desired the three way valve 56 can be manipulated in the manner to move the movable assembly 28 so that the buffer member 30 is slightly spaced from the stop surface at 60 on the fifth wheel coupler 16. Under such conditions a limited amount of angular movement between the tractor and trailer is permitted before additional angular movement is resiliently resisted by the action of the springs 46.

The three way valve 56 can be manipulated not only to bring the buffer member 30 into contact with the stop surface 60 on the fifth wheel coupler 16, but sufficient pressure can be applied by way of the hydraulic actuators 50 so that the springs 46 are slightly compressed when the tractor and trailer are longitudinally aligned. Such operation applies a preload to the fifth wheel coupler 16 which increases the resistance to a change in angle between the tractor 12 and trailer 14.

The buffer member 30 tends to pivot about a selected one of the pair of pins 40 associated with the link assemblies 34 or 36 depending on the direction of turning movement of the tractor 12 relative to the trailer 14.

The amount of pivotal movement between the tractor and the trailer can be positively limited by means of a pair of stop mechanisms 70 in the form of hydraulic jacks mounted on the base member 32 as seen in FIG. 1. The hydraulic jack 70 may be adjusted manually to extend the rods 72 to a predetermined position which will determine the maximum amount of pivoting of the buffer member 30 about either of the pivots 44. By properly selecting the disposition of the ends of the rods 72, the resilient resistance to a change in angular articulation between the tractor and trailer can be interrupted by a positive stop to position the buffer member 30 at a slightly spaced relationship to the stop surfaces 60 and to so position the ends of the rod 72 so that a limited amount of angular change between tractor and trailer is permitted until abutment surfaces 58 engage stop surfaces 60. Thereafter further angular change is resiliently resisted until such time as the ends of the rod 72 are engaged by the buffer member 30.

Although the resilient resistance to the change in position between the buffer member 30 and base member 32 is afforded by way of springs 46, it is contemplated that some, if not all, of the springs 46 can be replaced by other resilient means such as shock absorbers or dashpots.

It will be seen that an anti-jackknife mechanism for a tractor-trailer combination has been provided in which the tractor and trailer are articulated relative to each other about a vertical axis and wherein the tractor is provided with a stop member which moves as a unit with the tractor and which is positioned to be engaged by a movable assembly to resiliently resist articulation between the tractor and trailer. The movable assembly can be moved to a retracted position in which the tractor and trailer can be articulated normally without any interference from the anti-jackknife mechanism. In the operative position the anti-jackknife mechanism resiliently resists any change in angle between the tractor and the trailer.

An anti-jackknife device for tractor-trailer vehicles has been provided in which an arrangement associated with the tractor and trailer can be adjusted relative to each other to resiliently resist a change in angular disposition between the tractor and trailer. Also positive stops are provided to limit the maximum amount of resilient resistance.

The embodiments of the invention in which an exclusive property or privilege is claimed are defined as follows:

1. An anti-jackknife mechanism for a tractor-trailer combination comprising; means coupling a tractor and trailer together for articulation relative to each other about a vertical axis, a stop member fixed on said tractor having a pair of stop portions radially and symetrically spaced relative to said axis, a base member supported on said trailer, a buffer member supported on said trailer for movement relative to said base member, means limiting movement of said buffer member in one direction relative to said base member, means resiliently resisting movement of said buffer member relative to said base member in the other direction, and means to move said base member and buffer member relative to said trailer from a first position wherein said tractor and trailer are free to pivot relative to each other about said vertical axis and a second position wherein said buffer member is engagable with said stop portions to resiliently resist articulation of said tractor and trailer relative to each other.

2. The combination of claim 1 and further comprising pivot means formed at opposite sides of said buffer member, one or the other of said pivot means being operable to afford pivoting of said buffer member relative to said base member upon articulation of said tractor and trailer in one direction, and the other of said pivot means being operable upon articulation of the tractor and trailer in the other direction.

3. The combination of claim 1 wherein said means resiliently resisting movement of said buffer member are a plurality of springs.

4. The combination of claim 1 wherein said means for moving said base member are fluid operated means operable from a position on said tractor.

* * * * *